United States Patent [19]

Knapp

[11] 4,042,031
[45] * Aug. 16, 1977

[54] PLUGGING SUBTERRANEAN EARTH FORMATIONS WITH AQUEOUS EPOXY EMULSIONS CONTAINING FINE SOLID PARTICLES

[75] Inventor: Randolph H. Knapp, Houston, Tex.

[73] Assignee: Shell Oil Company, Houston, Tex.

[*] Notice: The portion of the term of this patent subsequent to Jan. 4, 1994, has been disclaimed.

[21] Appl. No.: 713,758

[22] Filed: Aug. 12, 1976

Related U.S. Application Data

[63] Continuation-in-part of Ser. No. 631,774, Nov. 13, 1975, Pat. No. 4,000,781, which is a continuation-in-part of Ser. No. 571,195, April 24, 1975, abandoned.

[51] Int. Cl.$^2$ .................... E21B 33/138; E21B 43/04
[52] U.S. Cl. .................................... 166/276; 166/295; 427/386
[58] Field of Search ............... 166/276, 278, 294, 295; 427/386, 212, 221

[56] References Cited

U.S. PATENT DOCUMENTS

| | | | |
|---|---|---|---|
| 2,880,116 | 3/1959 | Alps et al. | 427/386 X |
| 3,294,166 | 12/1966 | Havenaar et al. | 166/295 |
| 3,309,224 | 3/1967 | Weber | 427/386 X |
| 3,339,633 | 9/1967 | Richardson | 166/295 |
| 3,416,604 | 12/1968 | Rensvold | 166/295 |
| 3,428,122 | 2/1969 | Methven et al. | 166/295 |
| 3,621,915 | 11/1971 | Bruist et al. | 166/276 |
| 3,738,862 | 6/1973 | Klarquist et al. | 427/386 |
| 3,826,310 | 7/1974 | Karnes | 166/276 |
| 3,867,986 | 2/1975 | Copeland | 166/295 X |
| 3,935,339 | 1/1976 | Cooke, Jr. | 427/386 X |

Primary Examiner—Stephen J. Novosad

[57] ABSTRACT

Openings such as the pores of a permeable subterranean earth formation are plugged by inflowing a slurry of fine solid particles suspended in an aqueous emulsion that contains a dispersed oil-phase solution of a polyepoxide, an aminosilane, and a tertiary nitrogen-containing amine which is capable of causing the polyepoxide to polymerize while causing the particles to become oil-wet.

10 Claims, No Drawings

PLUGGING SUBTERRANEAN EARTH FORMATIONS WITH AQUEOUS EPOXY EMULSIONS CONTAINING FINE SOLID PARTICLES

CROSS-REFERENCE TO RELATED APPLICATIONS

This application is a continuation-in-part of application Ser. No. 631,774 filed Nov. 13, 1975, now U.S. Pat. No. 4,000,781, which is a continuation-in-part of application Ser. No. 571,195 filed Apr. 24, 1975, now abandoned.

BACKGROUND OF THE INVENTION

The invention relates to a process for consolidating and/or plugging a mass of the particles or permeable material in a location that is relatively remote and hot, such as a region in or around the borehole of a well. The invention is particularly useful for emplacing a formation-strengthening plugging material within a permeable structure such as a subterranean reservoir.

Treatments for consolidating a mass of particles in a relatively remote location, such as an unconsolidated reservoir or a sand or gravel mass within the borehole of a well, comprise known and commonly used procedures. The present invention relates to a particularly advantageous type of such a treatment, one completed by contacting the particles with a single aqueous liquid.

Resin-forming mixtures of polyepoxides and amines of the types used in the present invention have been used or proposed for use in prior processes such as the following. The process of Havenaar and Meys U.S. Pat. No. 3,294,166 permeably consolidates a subterranean sand by first displacing water away from the region to be treated and then injecting an oil-phase liquid solution of a resin-forming mixture from which the solidifying resin is precipitated. The process of the E. A. Richardson U.S. Pat. No. 3,339,633 is similar except for using a more concentrated solution of resin-forming materials and over-flushing to ensure permeability. The process of the Bruist-Hamby-Simon-Tuttle U.S. Pat. No. 3,621,915, and also that of U.S. Pat. No. 3,8 3,857,444 form permeable resin-consolidated sand or gravel packs by coating the pack grains with oil-phase liquid solutions of resin-forming components in polar solvents suspending the coated grains in liquids that are partially, but incompletely, miscible with the solutions of resin-forming material and then pumping in the suspensions. The process of the Knapp and Almquist U.S. Pat. No. 3,933,204 plugs plus (and consolidates) a permeable subterranean formation by injecting an aqueous emulsion that contains dispersed oil-phase liquid solutions of both acrylic and epoxy resin-forming materials and polymerization rate controlling materials and forms a relatively solid gel throughout the volume occupied by the emulsion.

A process for manufacturing a low cost construction material was described by A. S. Micheals in Industrial & Engineering Chemistry, September 1960. In that process a resin-forming mixture of polyepoxides, an amine and an organic solvent was mixed with an aqueous slurry of sand grains. The so-treated sand grains were then strained free of liquid, pressed together, and cured at about 340° F, to form a construction material said to have high strength, high bonding efficiency, and good water repellency.

SUMMARY OF THE INVENTION

The present invention relates to plugging openings, such as the pores of a permeable earth formation, in a remote location into which fluid can be flowed, such as a subterranean location in or around the borehole of a well. A polymerizable polyepoxide mixed with a relatively water-soluble tertiary nitrogen-containing amine which is capable of both catalyzing the polyepoxide polymerization and causing the oil-wetting of solid surfaces, is dissolved into an oil-phase liquid solution. The oil-phase liquid solution is dispersed within an aqueous liquid, to form an oil-in-water cationic emulsion that is capable of wetting solid surfaces with an oil-phase liquid solution of resin components which subsequently form a solid resin. Very fine solid particles and an amino-alkoxy silane are mixed with the emulsion, to form a suspension of fine solids wetted by the oil-phase liquid solution. The suspension is flowed into the openings to be plugged, in the form of a succession of portions each having a composition that is no longer affected by a formulation change at the compounding location. Within the openings to be plugged the in-flowed suspension is kept relatively static so that the suspended solids become resin-bonded to each other and to the walls of the openings

DESCRIPTION OF THE INVENTION

The invention is, at least in part, premised on the following discovery. An oil-phase liquid solution of epoxy resin-forming components can be formulated and applied to solid surfaces so that it wets the surfaces and resin-coats them in the presence of an aqueous liquid. In order to do this, although substantially any polymerizable polyepoxide can be used, the curing agent should be a tertiary nitrogen-containing amine which is relatively water-soluble and is capable of both catalyzing the polyepoxide polymerization and oil-wetting a solid surface. The composition and concentration of the oil-phase liquid solution components can be arrangd so that the rate of polymeration is relatively low at substantially normal atmospheric temperatures (e.g., from about 40° to 110° F), but becomes high enough in a relatively hot 20 location (e.g., at from about 80° to 350° F), to cause the resin to solidify within a few hours. Solid surfaces can be coated with the resin-forming solution by contacting them with a cationic oil-in-water emulsion of the solution with the pH of the emulsion at a value that causes the emulsion to break while it is in contact with the surfaces to be coated. The order of component mixing can be varied as a matter of convenience. And, such coating treatments of solid surfaces can be arranged to substantially completely plug the pores of a permeable material.

In the present resin-forming oil-phase liquid solutions and suspensions, the amine is a tertiary nitrogen-containing amine which is relatively water-soluble and is capable of functioning as an oil-wetting surface active agent. The polyepoxide and amine dissolve to form or become an oil-phase liquid solution in which the polyepoxide is polmerizing. The rate of the polymerization is affected by the composition and proportion of the components and the temperature of the solution. When the oil-phase liquid solution is mixed with an aqueous liquid, the proportion of the amine that remains in the oil-phase solution (where it is available to catalyze the polymerization within the oil-phase liquid) is affected by the amount of amine that was initially present, the water-solubility of the amine, and the neutral salt content and pH of the aqueous liquid. In such a mixture, the liquids and their components become partitioned so that, among other things some of the amine is dissolved in the aqueous liquid and some of the aqueous liquid is dissolved in the oil-phase liquid. Within the aqueous liqid an equilibrium exists between the amount of the amine that remains as such and the amount that becomes converted to substituted ammonium ions (which form when protons in the aqueous liquid combine with molecules of the amine). Decreasing the pH of the aqueous liquid increases the proportion of substituted ammonium ions and also increases the amount of the amine that can be dissolved in the aqueous liquid. Both of these effects decrease the proportion of amine available for catalyzing the polymerization within the oil-phase liquid solution.

A resin-forming polyepoxide suitable for use in the present invention comprises substantially any polyepoxide that contains a plurality of reactive epoxy groups and polymerizes in the presence of conventional amino curing-agents for causing epoxy resins to form cured (solid) epoxy resins. Examples of suitable polyepoxides are described in the book, "Epoxy Resins" by H. Lee and K. Nevill, McGraw Hill, New York, 1957, and/or in the U.S. Pat. No. 2,633,458, or the like. Particularly suitable polyepoxides comprise those available from Shell Chemical Company as EPON 815 or EPON 828, or the emulsifiable nonionic surfactant containing "epoxies" or epoxy resin-forming materials available from General Mills as Genepoxy M200, M205 or TSX-679 emulsion or the like.

Tertiary nitrogen-containing amines suitable for use in the present invention are equivalent to tertiary-amines which are relatively free of pluralities of nitrogen atoms to which hydrogen atoms are attached, are capable of catalyzing the polymerizations of poly-epoxides, are relatively water soluble, and are oil-wetting surface active materials. Examples of suitable curing agents include dimethylaminomethyl phenol (available as DMP-10 from Rohm and Haas), 2,4,6-tri(dimethylaminomethyl) phenol (available as DMP-30 from Rohm and Haas), the tri-2-ethylhexoate salt of 2,4,6-tri(-dimethylaminomethyl) phenol (available as Curing Agent D from Shell Chemical Company), and the like. Other suitable organic acid salts of such tertiary amines are also useful, e.g., the benzoates, acetates, propionates, butyrates, isobutyrates, valerates, isovalerates, caproates, caprylates, caprates, laurates, myristates, and oleates. Other suitable tertiary amines include benzyldimethylamine and alpha-methylbenzyldimethylamine. Another suitable class of tertiary nitrogen-containine amines are the imidazoles such as imidazole, and 2-ethyl-4methyl imidazole (EMI), and the like. Such tertiary-amines can be used in the form of mixtures in which properties such as a high water-solubility but a low catalytic activity of one can be balanced by an opposite arrangement of the magnitudes of those properties in another. Pyridine and its derivatives (such as the picolines and pyridones), butyldimethylamine, and triethanolamine, etc., can be used and can increase the water-solubility of a mixture because of their relatively high water miscibility and solvent characteristics. The related triethylamine, which is only slightly water soluble, may be useful for its catalytic activity. The dipolyethoxylated aliphatic tertiary-amines such as the Ethomeens (Armak Chemical Company) have less water solubility, but are known to be good hardeners or curing agents for epoxy resins.

An aqueous liquid suitable for use in the present invention can comprise substantially any relatively fresh or potable relatively soft water or aqueous liquid solution. In general, such aqueous liquids preferably contain less than about 10,000 parts per million total dissolved solids, and less than about 1,000 parts per million multivalent cations.

The aqueous emulsions of the present invention are oil-in-water emulsions in which the dispersed oil-phase components consist essentially of the polyepoxide and the tertiary-amine. The aqueous liquid polyepoxide and amino curing-agent can be mixed together in any order. However, it is generally preferable to first form an aqueous emulsion containing the polyepoxide and then combine that emulsion with the amine.

Such emulsions can advantageously contain a small amount of a water-thickening agent, such as a hydroxyethylcellulose ether, to improve their stability at normal atmospheric temperature. The emulsions preferably contain an emulsion stability-enhancing-amount (e.g., 1–2% by weight) of a nonionic surfactant, such as a sorbitan polyoxyethylene monolaurate available as TWEEN 20, a sorbitan monolaurate available as SPAN 20, polyoxyethlene-lauryl alcohol condensates available as BRIJ 30 and BRIJ 35, the PLURONIC polyols available from BASF Wyandotte, etc. The preferred particle size for the epoxy emulsions is one micron or less.

In the parent application it is disclosed that the emulsions of the present invention can, where desirable, contain relatively small proportions of silanes or other silicon compounds which are reactive with epoxy groups. Such silicon compounds may function as bonding agents that increase the bond strength between the resinous materials and sand grains or other particles. Examples of silicon compounds which may be suitable for use in the present invention include the hydroxy or amino group-containing silanes of the type described in the T. F. Mika U.S. Pat. No. 2,843,560. The patent describes silane-containing polyepoxy polymers which form resins having increased coating and bonding strengths. The suitable silicon compounds also include the silanes described in U.S. Pat. No. 3,150,116 relating to silane-modified epoxy resins formed from polyepoxides which contain a plurality of hydroxyl groups. Other suitable silicon compounds include the aminopropyltriethoxy silanes such as the gamma-aminopropyltriethoxy silane which is available from Union Carbide under the name SILANE A-1100, and epoxide group-containing epoxyalkylsilane ester, such as beta-(3,4-epoxycyclohexyl) ethyltrimethoxysilane, which is available from Union Carbide as SILANE A-186. Preliminary tests are generally desirable to determine whether a given silane is advantageous in a given situation. Situations have been observed in which a particular silane is detrimental relative to allowing the epoxy to spread on the silica surfaces. Wetting may occur, only with very large contact angles. Also certain silanes have been observed to be incompatible with otherwise suitable water samples. Other situations have been observed where a particular silane is beneficial and necessary.

Where a relatively large proportion of very fine particles is mixed with such an emulsion, particularly where the particles are siliceous materials, the presence of an aminoalkoxy silane is uniquely beneficial. For example, where the composition of the emulsion is analogous to one containing about 88% of the polyepoxide emulsion, about 9% of a tertiary-amine catalyst, about 2% of a pH-adjusting aqueous acid and about 10 lbs per gallon of substantially clay-sized silica sand particles, the mixture tends to become substantially solid and unpumpable if no silane is present; or if the only silane present is an epoxyalkyl silane ester, rather than an aminoalkoxy silane. On the other hand, where the aminoalkoxy silane is present, such a relatively concentrated suspension is pumpable and, where desirable, can be diluted and made less viscous by adding additional aqueous fluid. And, when particles suspended in an amino-alkoxy silane-containing emulsion are kept static within a relatively concentrated portion of such a suspension or are filtered out on the face of or within the pores of an earth formation, the particles become consolidated into an integral mass of surprisingly high compressive strength and low permeability. The compressive strengths of such masses can be in the order of 3000 psi and their permeabilities can be as low as 0.01 md.

Various procedures can be used for flowing the very fine particle-containing suspensions of the present invention into the openings to be plugged. For example, the suspension can be injected into a permeable earth formation (in fluid communication with a subterranean portion of a wellbore) so that some of the solids penetrate into the pores of the earth formation and some are compacted into a filter-cake on the face of the formation. In fractures within an earth formation, after the suspension has been displaced within the fracture, it can be kept static so that the particles will become bonded to each other and the fracture walls. Then, when more fluid is injected into the fracture, the so-bonded particles will tend to remain in place (on one wall or the other) while the walls are separated by hydraulic pressure, and the plugging effects of successive injections into a fracture will be cumulative. When the present type of suspension is flowed into the pores of a weak or unconsolidated permeable earth formation, the pore-plugging mass into a rigid structure, rather than a relatively deformable structure, such as is formed by most resins or gels. In sealing surface soils, pits, earthen dams, or the like, the present suspensions can advantageously be flowed or sprayed over the soil or used in conjunction with a permeable fabric, for example by procedures such as those described in U.S. Pat. No. 3,939,662.

Where desired, for example in order to increase the ability of the emulsified resin-forming components to flow into a relatively low permeability formation such as a tight reservoir, the polyepoxy components and/or other oil-phase materials used in the present emulsions can be diluted with a polar solvent. This makes a "softer" emulsion in which the dispersed droplets of the oil-phase components are less viscous and can more readily be deformed as they are being displaced through tight openings or capillaries within the reservoir. Suitable solvents comprise substantially any liquid polar organic solvent for polyepoxides. Examples of suitable solvents include alcohols, esters, ethers, ketones, or the like, such as methylisobutyl ketone, 2-(2-ethoxy)-ethanol, ethyl acetate, methyl ethyl ketone, etc. Polar solvents that are relatively miscible with both oil and water may be desirable in enhancing the miscibility between the oil-phase liquid solution of the resin-forming components and any aqueous liquid that surround solid surfaces which have been wetted by the resin-forming solution. For example, when sand grains have been wetted with the solution of resin-forming components, suspended in an aqueous carrier fluid and screened out against a reservoir formation, the presence of such a mutually water-and-oil miscible solvent in the solution of resin-forming components tends to keep the outermost layers of the coatings on the grains somewhat soft and miscible so that the coating components on one grain tend to mix with and become bonded to those on an adjacent grain. Particularly suitable oil and water miscible solvents include acetone, the lower alcohols, methyl ethyl ketone, methyl isobutyl ketone, etc.

The pH of an emulsion of the present invention is preferably correlated with respect to the composition and concentration of the amino curing-agent and the surface charge properties of the particles to be coated. For example, water-wet silica surfaces exhibit a negative charge where the pH of a surface-contacting aqueous liquid is above about 2.2. Because of such a surface charge effect, when a cationic emulsion is flowed into a siliceous sand, the emulsion breaks and the grains are coated with the material that constituted the dispersed phase of the emulsion. This phenomena is commonly used in applying asphalt emulsions to sands and gravels for road construction.

In the emulsions of the present invention, the amino curing-agents are oil-wetting surface active materials that cause a surface attraction between the dispersed droplets of polymerizing polyepoxide and the particles to be coated, and also cause the curing of the resins that are being formed by those polymerizing resinous materials. For a given amino curing-agent the strength of the attraction between the oil-phase droplets and the surfaces of the particles can be controlled by adjusting the pH of the emulsion system. For a given curing-agent the surface attraction increases as the pH decreases. In addition, pH usefully controls emulsion break time and resin gel time The particle sizes of the droplets and fine solids that are dispersed in the present emulsions are preferably correlated with permeability of the mass of particles into which the emulsion is to be flowed. When the size of such particles is more than about 1/3 of the size of the pores within a mass grains, the particles tend to bridge across the plug the openings. For indepth invasions, particle sizes smaller than about one tenth the pore size are preferred. The opening-plugging droplets can only be pushed on by deforming them so that they undergo a viscous flow. In the present emulsions, relatively small particle sizes are readily obtainable. The epoxy emulsion TSX-679 (available from General Mills) contains about 50% by weight of polyepoxide emulsified in water and stabilized by a nonionic surfactant. Such emulsions may also contain small amounts such as ½% by weight of hydroxyethyl cellulose ether, or other water-soluble thickeners to improve the emulsion stability. The mean particle size in such an emulsion is about 1 micron, with about 11.8% of the droplets being less than 0.5 micron. The attainment of small particle sizes can be aided by mixing devices such as colloid mills or other mixing devices that generate shearing energy. Further, a small particle size emulsion can be obtained by the use of an emulsion inversion technique in which the oil-phase liquid solution of the polepoxide and amine is sheared by a device such as a Cowles dissolver as water is gradually added, until the emulsion inverts to a water continuous system. The ability of the emulsions to penetrate fine pores can be further enhanced by diluting the droplets with a polar solvent in order to reduce their effective viscosity.

In general, the fine particles used in the present process can be substantially any which are at least as fine as a medium silt, i.e., less than about 40 microns in diameter, and have surfaces which are adapted to be oil wet, water-insoluble minerals such as silica and the various silicates, carbonates, sulfates, and the like are generally suitable. Substantially clay-sized silica particles containing significant proportions of particles with average diameters of less than about 4 microns are particularly suitable. Such particles are commercially available under the trade name IMSIL A-10 from Illinois Mineral Company; SYLOID Silicas from Davidson Division of W. R. Grace Company, and the like. Where it is desirable that the particles flow through the pores of an earth formation, gravel pack or the like, the average diameters of the largest suspended particles should be less than about 1/3 the average diameters of the pores. For in depth invasion particle sizes less than about one-tenth the pore sizes are preferred. Alternatively, where it is desirable to form a filter cake on the face of the earth formation such fine particles should be mixed with larger particles to cause a bridging across the opening of the pores and the buildup of a filter cake on the upstream side of such bridges. If desired, such larger or bridging particles can be precoated with a resin-forming liquid, as described in the parent patent application, before being added to a suspension of very fine particles prepared in accordance with the present invention.

The following exemplifies a preferred procedure for compounding a suspension of very fine particles in accordance with the present process. An emulsion, such as one containing about 88% of polyepoxide, 9% of tertiary amine catalyst, 2% of pH-adjusting aqueous acid, and 1% of aminoalkoxy silane, is placed within a mixing device. Substantially clay-sized silica particles, e.g., IMSIL A-10, are added while mixing the emulsion with the proportion of silica particles to emulsion being about 10 ppg. This provides a relatively concentrated slurry having a mixable viscosity of about 3,500 centipoises. The mixing is continued until a sample of the emulsion (while being kept substantially quiescent at the temperature at which the emulsion is being mixed with the silic begins to break into separate aqueous and oil-phase liquids. At about this time, the concentrated suspension is preferably diluted to a readily pumpable viscosity by adding additional aqueous liquid. The suspension can then readily be pumped into a well, or otherwise flowed into the openings to be plugged. Particularly suitable pumpable slurries contain about 1 to 3 pounds of coated silica fines per gallon of carrier fluid.

The carrier fluid used in the present process can be substantially any fresh water or relatively low salinity brine or such a water or brine containing a water thickening agent. The compressive strengths of plugs formed by such suspension have been relatively high where the concentrated suspensions of coated fines were diluted with an aqueous 1% potassium chloride brine, an aqueous 3% sodium chloride brine, or a gelled aqueous 1% potassium chloride brine containing from about 60 – 80 pounds per 1,000 gallons of hydroxyethyl cellulose. A thickened carrier fluid is recommended for such suspensions when larger particles are added to the suspension to ensure bridging and filter-cake formation. Where the only solids are substantially clay-sized particles, the carrier fluid can advantageously be an unthickened aqueous solution. From such a diluted suspension of very fine particles the settling is relatively insignificant. Where a thickened suspension of clay-sized particles is desired an aqueous liquid containing from about 20 to 40 ppg of a cellulose ether water thickener is preferred. Where it is desired for the thickened solution to be self-thinning such a cellulose ether water-thickening agent is preferably mixed with an oxidation or reduction type of breaker, and ammonium persulfate is particularly suitable.

In the present process the amount of resin-forming components needed to provide a strongly-bonded mass of fine plugging particles is surprisingly small. For example, where an emulsion contains (in volume percent) about 88% TSX-679 polyepoxide emulsion, 9% DMP-10 tertiary-amine curing agent, 2% concentrated HCl, 1% A-1100 gamma-aminopropyltriethoxy silane, and IMSIL A-10 clay-sized silica particles in a proportion of from about 10 pounds of silica per gallon of emulsion, the weight proportion of the resin-forming components is only about 4.5 ppg. This provides a ratio of silica particles to resin-forming components of about 2.22 pounds per pound. When a similar emulsion is used to coat a 20 – 40 mesh gravel (as described in the parent application), the emulsion preferably contains about 2.5 pounds of resin-forming components per gallon, and is used to coat 41 pounds of gravel per gallon. That provides a silica to epoxy ratio of about 16.4 pounds per pound. And, since in a preferred procedure for so-coating a gravel, about 20% of the resin components are removed in a washing step, the resulting silica to epoxy ratio becomes about 20.5 pounds per pound.

In view of the difference in these ratios, it is somewhat surprising that good compressive strengths are obtained with silica fines in a silica to epoxy ratio of about 2.22. The fines have a much larger surface area and thus the coating on their surfaces is much thinner. By calculations based on the particles being generally spherical the coating thickness is about 0.41 microns for the fines and about 7.8 microns for the 20 to 40 mesh particles. In comparative tests of the strengths of the so-consolidated masses, the compressive strengths of the consolidated fines was about 3000 psi, while that of the consolidated gravel was about 1000 psi. It appears that such a relatively high strength for the thinly coated fines may be due to the vast number of contact points. A mass of IMSIL A-10 particles contains more than $10^{10}$ particles per gram while a mass of the 20 – 40 mesh gravel contains only about $10^4$ particles per gram.

In the present process, the rate of polymerization of the resin-forming components is, as in the parent process, controlled by the pH of the emulsion. As described in the parent application, this can advantageously be used to control the time available for inflowing the fines-containing slurry into the opening to be plugged.

In the present slurries of resin-component coated fine particles the viscosity of the slurry increases as the resin-forming components react and the polymerization continues. Where the suspension is relatively quiescent it subsequently becomes a porous solid or gel. Table I shows the porosity and compressive strengths of suspensions which have been allowed to gel and become substantially completely cured. The suspensions were formed by diluting to the indicated proportions of IMSIL A-10 silica particles to carrier fluid after coating the particles at 10 ppg in an emulsion containing (in volume percent) 88% TSX-69 polyepoxide emulsion, 9% DMP-10 tertiary amine, 1% A-1100 aminopropyl silane, and 2% of aqueous 38% by weight HCl. It should be noted that a relatively high compressive strength of about 2900 psi was obtained with a relatively highly porous gelled sample having a fractional porosity of .522. The permeability of such a gelled and cured material is about 1 md.

TABLE I

| IMSIL A-10/CARRIER FLUID RATIO LB/GAL | COMPRESSIVE STRENGTH PSI | FRACTIONAL POROSITY* |
|---|---|---|
| 0 | 0 | 1.0 |
| 1 | 10 | 0.916 |
| 2 | 35 | 0.845 |
| 3 | 75 | 0.785 |
| 4 | 200 | 0.732 |
| 5 | 300 | 0.686 |
| 6 | 600 | 0.645 |
| 7 | 1200 | 0.609 |
| 8 | 1900 | 0.577 |
| 9 | 2600 | 0.548 |
| 10 | 2900 | 0.522 |

*Fractional carrier fluid volume. Resin component volume included with silica particles volume. Silica particles to epoxy ratio: 2.22 lb/lb.

A test was made of plugging a Berea core with a suspension containing about 1 ppg of resin component coated IMSIL A-10 silica fines in water (prepared by the preferred procedure described above). The core, which had an initial permeability of about 40 millidarcies, was plugged to a permeability of 0.02 millidarcies by injecting the suspension and allowing it to cure for 65 hours at 140° F. An aqueous 1% potassium chloride solution was then backflowed through the core in opposite direction and this caused the permeability to increase to 0.1 millidarcies. The near-inlet-face location of the plugging material within the core was indicated by cutting off 0.31 centimeters from the upstream end of the core. The permeability of the remaining portion of the core was found to be 10 millidarcies. A consolidated filter-cake of silica fines, having a thickness of about 1/16-inch, was apparent on the inlet face of the core.

The plugging and consolidating effect of injecting a fines-containing suspension of the present invention into an unconsolidated sand pack was tested. The sand pack was formed from Clemtex No. 5 sand (a 80 to 100 mesh silica sand available from Clemtex Ltd.). The initial permeability of the sand pack (relative to an aqueous percent potassium chloride solution) was about 3400 millidarcies. The suspension used was prepared by the preferred procedure described above and contained about 2 ppg of IMSIL A-10 and 60 pounds per 1,000 gallons of hydroxyethyl cellulose. The sand pack was about 1 inch in diameter and 2½ inches long. The suspension was displaced into the pack and allowed to cure for 36 hours at a temperature of 148° F. This reduced the permeability of the pack to about 7 millidarcies. When aqueous 1% KCL solution was flowed through the pack the permeability rose to and became stabilized at about 30 millidarcies. A second portion of the suspension was displaced in the pack and allowed to cure for 65 hours at 148° F. This reduced the permeability of the pack to 0.6 millidarcies.

Stress-strain measurements were made on the central portion of the Clemtex sand that was consolidated by the present suspension. The compressive strength of this portion was 3700 psi. During the increasing of the applied stress from about 250 to 2800 psi, the strain increased along a substantially straight line from 0 to 0.01 inch per inch. As the stress was increased to 3700 psi, the strain increased at a slightly higher rate until, at 0.02 inch per inch, a brittle failure occurred.

Comparative measurements were made on a portion of a similar Clemtex No. 5 unconsolidated sand that had been consolidated with the epoxy/acrylic gel plugging solution of U.S. Pat. No. 3,933,204. In this case, while the applied stress rose from about 0 to 95 psi the strain increased from 0 to about 0.03 inch per inch. From this point on the sample exhibited plastic deformation with no evidence of brittle failure.

In general, the larger the particle size of the silica flow (or the smaller its surface area per mass unit) the greater the silica to coating emulsion that can be used. Typical examples of particle size and preferred silica to coating emulsion ratios are: 2.4 micron, 10 lb/gal; 15 micron, 15 lb/gal; 100 micron, 25 lb/gal; and 500 microns, 41 lb/gal. The coating emulsion formulation can be reduced in epoxy concentration by the addition of dilution water. The polymerization kinetics can be usefully controlled by changes in the coating emulsion pH. The preferred pH range of the formulation is pH 7.5 to pH 8.5. The polymerization kinetics can also be changed by changing the epoxy to curing agent ratio. Useful changes are obtained by changing this ratio by about 20 percent in either direction from the preferred formulation.

The test of the present invention was conducted in a high water cut oil well in which it was desired to plug two lower sets of perforations below a main 25-ft. sand member at a depth of about 5600 feet below the surface. It was suspected that the water was entering the lower sets of perforations from two lower sand stringers. All three sand bodies were being produced through a common gravel pack and screen so that a conventional plug back (using cement) would have included the costly operation of removing the gravel pack and then reinstalling it.

In order to place a slurry of the present type into the lower perforations without impairing the main sand member, a dump bailer technique was used for selective placement. A conventional type of dump bailer containing the slurry was positioned near but above the lower perforations. The bottom of the bailer was then blasted off by a signal from a logging truck. The relatively dense slurry then flowed by gravity out the bottom of the bailer into the lighter brine in the well, while brine entered the bailer through an open window at the top. The bailer was about 40 feet long, had an inside diameter of one inch, and a 2.8 gallon capacity.

The bottom hole temperature of the well was 148° F. The gel time for a four lb/gal slurry (using Imsil A-10 silica flour) was 17 minutes at this temperature. As a check on the time available to get the four lb/gal slurry to the treatment depth, by using the dump bailer, tests were made in the laboratory. During a 75-minute period of time, a sample of the slurry was heated gradually to 150° F as its viscosity was measured. The initial viscosity was 3000 cp and at 31 minutes the viscosity started increasing rapidly. This data indicated that with a reasonable heat up rate to 150° F the viscosity of the four lb/gal slurry did not start increasing rapidly for about 30 minutes. The time required to run a bailer to the 5600 feet depth was about 15 minutes. Thus, at least an additional 15 minutes would be available for dumping. The estimated dumping time for a 3000 cp slurry of density 10.4 lb/gal into a nine lb/gal well brine was calculated to be 18 minutes.

Four batches of the slurry were dumped into the well. The first two used 10 pounds of Imsil A-10 and one gallon of the Table II emulsion formulation. The next two used 15 lb of SSA-1 silica flour and one gallon of the emulsion. Each of these concentrated slurries were stirred for about 45 minutes at the 85° F ambient to coat the silica flour with epoxy. This concentrated slurry was then diluted with 1.5 gallons of HEC gel (60 lb/1000 gal). This gave a four lb/gal Imsil A-10 slurry and a six lb/gal SSA-1 slurry. The viscosity characteristics of these two slurries are similar. For this size treatment, the actual mixing volumes are given in Table II. A Hobart planetary gear electric mixer was used to mix the slurry which had a final total volume of about three gallons.

TABLE II
DUMP BAILER EMULSION FORMULATIONS

| Component | Volume | |
|---|---|---|
| TSX-679 | 3330 cc | |
| DMP-10 | 341 cc | |
| A-1100 | 38 cc | |
| HCl (38 percent weight) | 76 cc | |
| | 3785 cc = 1.0 gal | |
| Imsil A-10 or, | 10 lb | |
| SSA-1 | 15 lb | |
| HEC gel (60 lb/1000 gal) | 1.5 gal | |
| | | 2.5 gal carrier |
| 3 gal slurry | | |

The production history of the treated well indicates that, prior to the treatment, the initial production was as high as 155 BOPD. But, it was accompanied by a water production which increased from 75 BWPD initially to about 720 BWPD. And, as the water production increased, oil production decreased, so that just prior to the treatment the well was making only 9 BOPD.

After the dumping in of four batches of the present slurry the oil production reached 65 BOPD and the water production declined to about 520 BWPD. This level of oil and water production has been reasonably steady for more than a month following the treatment. Thus, it is apparent that the epoxy coated silica flour selectively impaired the water producing zone so that water influx was reduced. This allowed the bottom hole pressure to be reduced and, as a result, an increased oil production was possible.

What is claimed is:

1. A process for plugging openings within a region into which fluid can be flowed, comprising:
    compounding an oil-phase liquid solution of a polymerizable polyepoxide and a relatively water-soluble tertiary nitrogen-containing amine that is capable of both catalyzing the polyepoxide polymerization and oil-wetting a solid surface;
    dispersing the oil-phase liquid solution in an aqueous liquid to form an oil-in-water cationic emulsion which is capable of wetting solid surfaces with a resin-forming solution which will subsequently form a solid resin;
    mixing the emulsion with solid particles, which are at least about as finely divided as a silt, and with an aminoalkoxy silane which is capable of enhancing the oil-wetting of the surfaces of those particles with the oil-phase liquid component of the emulsion; and
    flowing the resultant fine solids-containing suspension into and keeping it relatively static within the openings to be plugged, until the resin-forming components have formed a solid resin.

2. The process of claim 1 in which the finely divided particles are substantially clay-sized siliceous particles.

3. The process of claim 2 in which the aminoalkoxy silane is gamma-aminopropyltriethoxy silane.

4. The process of claim 1 in which the resultant suspension is substantially free of any particles significantly larger than silt-sized particles.

5. The process of claim 1 in which the suspension contains sufficient particles of significantly larger size to provide a pore-bridging mixture of particle sizes.

6. The process of claim 1 in which the tertiary nitrogen-containing amine is dimethylaminomethylphenol.

7. The process of claim 1 in which the aqueous liquid is water that has been viscosified with hydroxyethyl cellulose.

8. The process of claim 7 in which an oxidizing agent is added to the viscosified aqueous liquid to reduce its viscosity in a time delayed fashion.

9. The process of claim 8 in which ammonium persulfate is the oxidizing agent.

10. A process for plugging openings within a near bottom portion of a well, comprising:
    compounding an oil-phase liquid solution of a polymerizable polyepoxide and a relatively water-soluble tertiary nitrogen-containing amine that is capable of both catalyzing the polyepoxide polymerization and oil-wetting a solid surface;
    dispersing the oil-phase solution in an aqueous liquid to form an oil-in-water cationic emulsion which is capable of wetting solid surfaces with a resin-forming solution which will subsequently form a solid resin;
    mixing the emulsion with solid particles, which are at least about as finely divided as a silt, and with an aminoalkoxy silane which is capable of enhancing the oil-wetting of the surfaces of those particles with the oil-phase liquid component of the emulsion;
    adjusting the concentration of the suspension relative to the time-temperature exposure of a fluid into a near bottom portion of the well within a dump bailing device capable of discharging fluid within a well;
    circulating fluid into the well bottom and out of the well top to the extent necessar toposition liquid having a density less than that of the suspension in the near bottom portion of the well; and
    disposing the suspension in the dump bailing device, running it into a near bottom location within the well, and discharging the suspension from the dump boiling device.

* * * * *